F. WORM.
CEMENT MANUFACTURING APPARATUS.
APPLICATION FILED MAY 24, 1912.

1,092,551.

Patented Apr. 7, 1914.
5 SHEETS—SHEET 1.

Witnesses:
C. C. Burnap
Henry A. Parks

Inventor
Fritz Worm
By Sheridan, Wilkinson, Scott & Richmond
Attys

F. WORM.
CEMENT MANUFACTURING APPARATUS.
APPLICATION FILED MAY 24, 1912.

1,092,551.

Patented Apr. 7, 1914.
5 SHEETS—SHEET 3.

Witnesses:

Inventor:
Fritz Worm
By Sheridan, Wilkinson, Scott & Richmond Att'ys

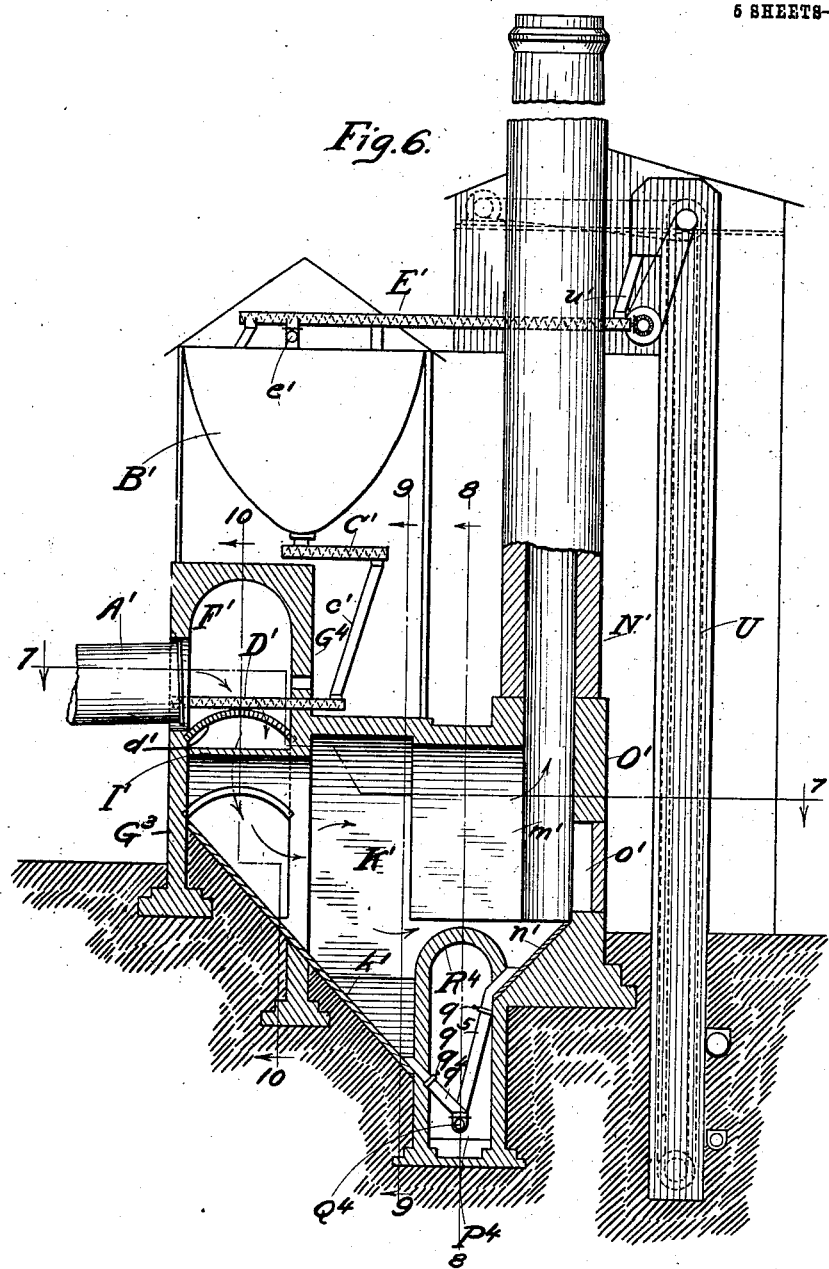

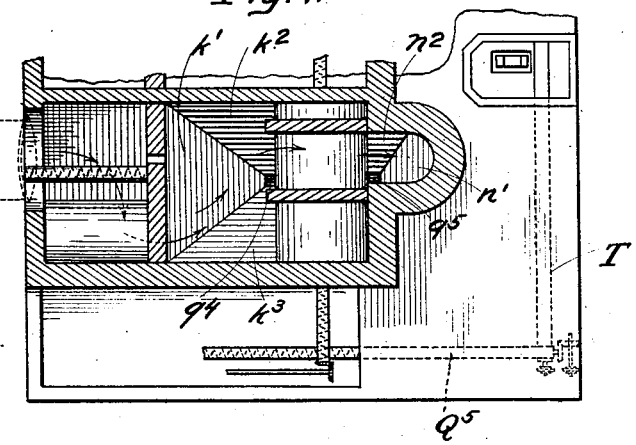
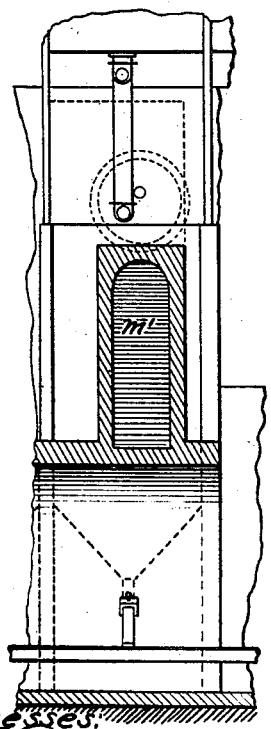
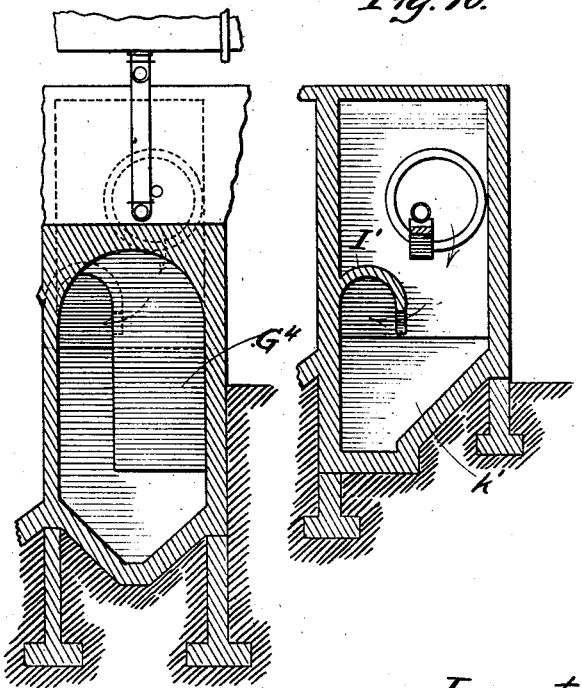
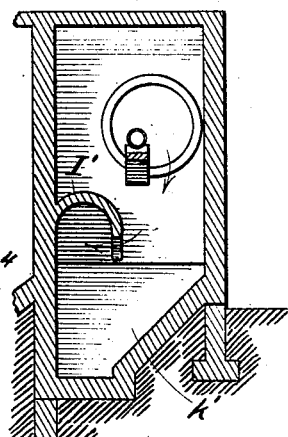

UNITED STATES PATENT OFFICE.

FRITZ WORM, OF LA SALLE, ILLINOIS, ASSIGNOR TO GERMAN-AMERICAN PORTLAND CEMENT WORKS, OF LA SALLE, ILLINOIS, A CORPORATION OF ILLINOIS.

CEMENT-MANUFACTURING APPARATUS.

1,092,551.      Specification of Letters Patent.    Patented Apr. 7, 1914.

Application filed May 24, 1912. Serial No. 699,393.

*To all whom it may concern:*

Be it known that I, FRITZ WORM, a citizen of the United States, residing at La Salle, in the county of La Salle and State of Illinois, have invented certain new and useful Improvements in Cement-Manufacturing Apparatus, of which the following is a specification.

My invention relates in general to cement manufacturing apparatus, and more particularly to the provision of dust collecting chambers between the feed end of a rotary kiln and the stack.

Inasmuch as the ground raw material is fed into a rotary kiln in an opposite direction to the draft therethrough, a considerable part of the raw material is carried up the stack by the draft, which results in waste, and is further objectionable in that the dust thus diverted from the kiln settles on the surrounding property.

The primary object of my invention is to provide a series of passages and chambers between the feed end of the kiln and the stack, which will deflect the particles of the raw material and cause them to settle before they reach the stack, but which will not interfere with the draft requisite to the efficient operation of the kiln.

A further object of my invention is to provide apparatus for causing the dust and fine particles of raw material carried from the feed end of a kiln toward the stack to settle in collecting chambers, and to return the precipitated dust from the collecting chambers to the feed hopper to be again supplied to the kiln.

A still further object of my invention is to provide improvements in apparatus for manufacturing cement which will increase the efficiency thereof and will reduce the expense of operation.

My invention will be more fully described hereinafter with reference to the accompanying drawings, in which the same is illustrated as embodied in two convenient and practical forms, and in which—

Figure 1:
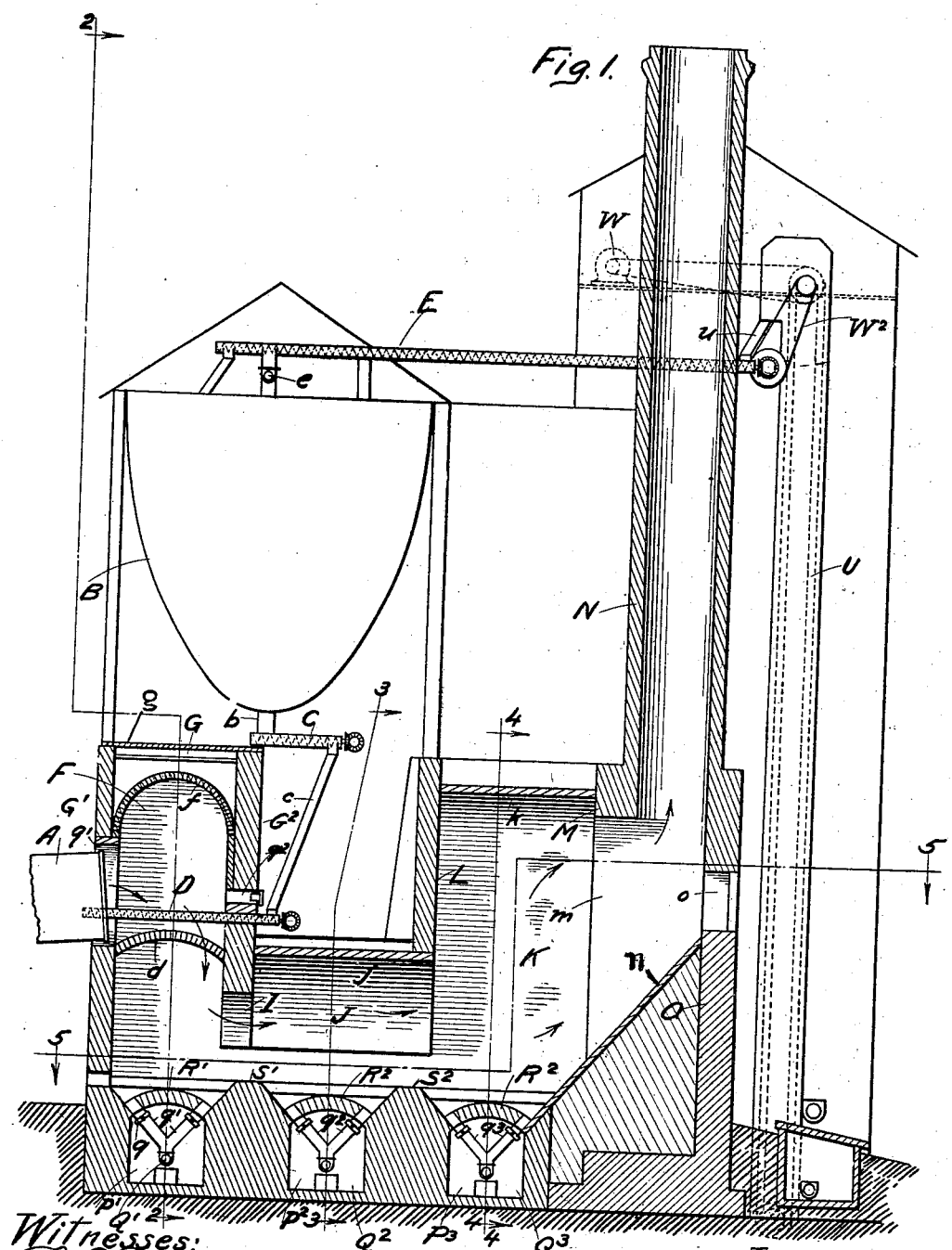
Figure 2:
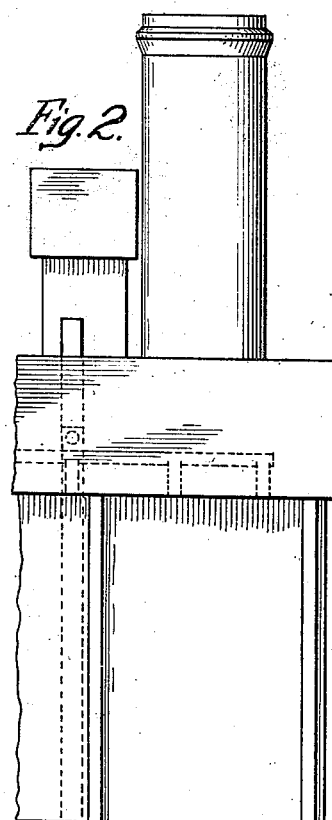
Figure 3:
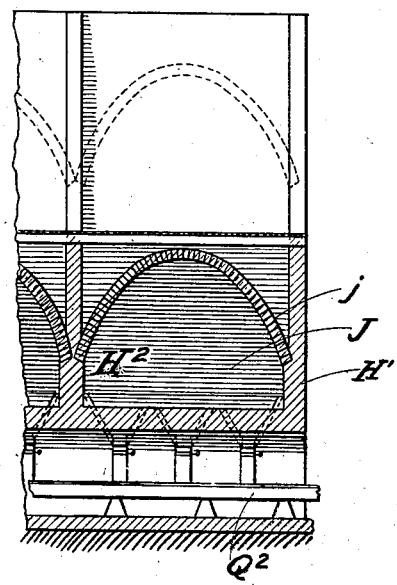
Figure 4:
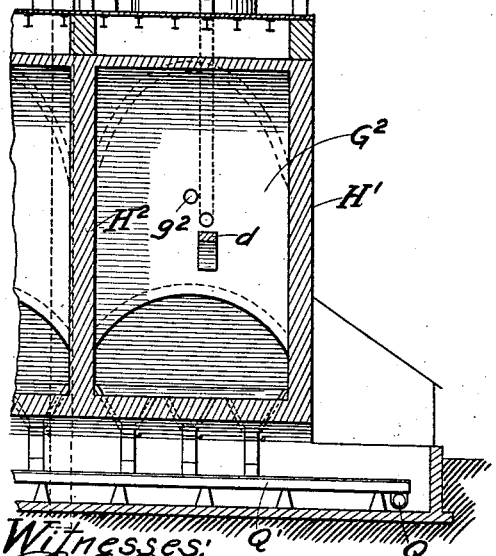
Figure 4:
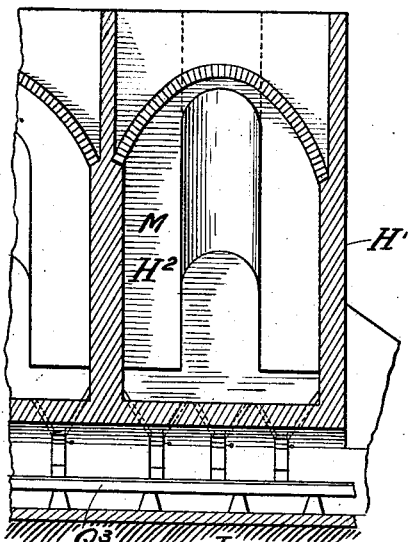
Figure 5:
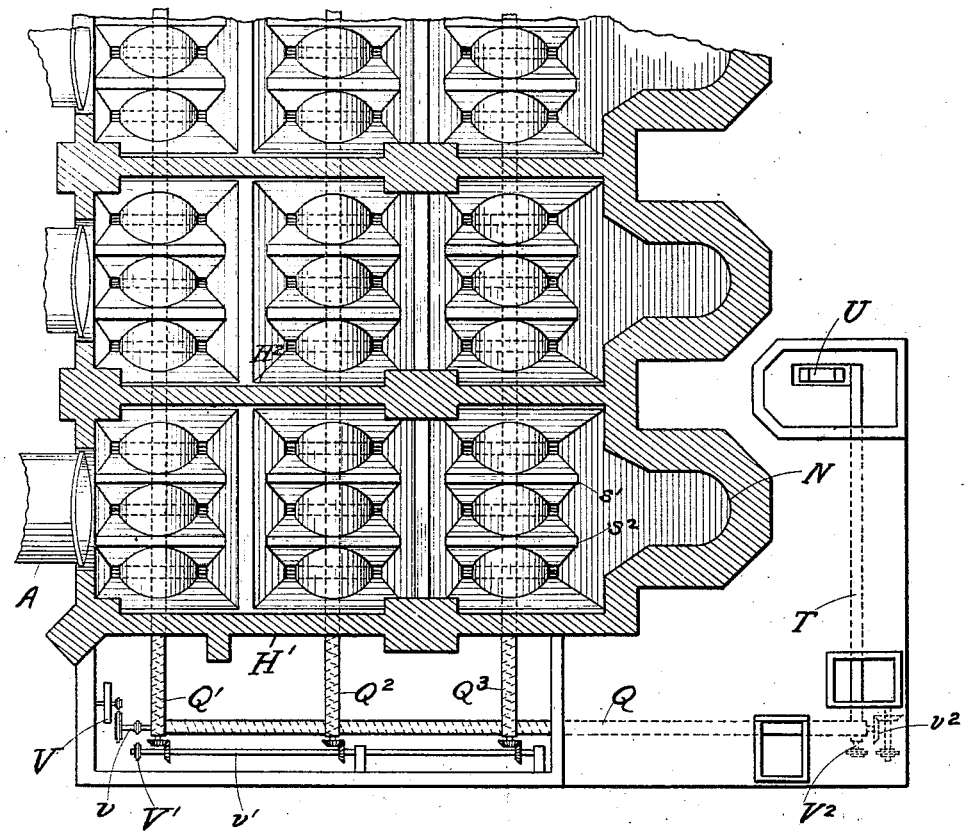

Figure 1 is a vertical longitudinal section of one embodiment of my invention; Fig. 2, a sectional elevation on line 2 2, Fig. 1; Fig. 3, a sectional elevation on line 3 3, Fig. 1; Fig. 4, a sectional elevation on line 4 4, Fig. 1; Fig. 5, a horizontal section on line 5 5, Fig. 1; Fig. 6, a view similar to Fig. 1, showing a modified form of my invention; Fig. 7, a sectional plan view on line 7 7, Fig. 6; Fig. 8, a sectional elevation on line 8 8, Fig. 6; Fig. 9, a sectional elevation on line 9 9, Fig. 6, and Fig. 10, a vertical section on line 10 10, Fig. 6.

Similar reference characters are used to designate similar parts in the several figures of the drawings.

A indicates the upper or feed end of a rotary cement kiln.

B designates the feed hopper from which the ground raw material is delivered through the outlet $b$ to the screw conveyer C, and thence through the conduit $c$ to the screw conveyer D, which extends into the feed end of the kiln A.

E indicates a screw-conveyer for supplying material to the feed hopper B, the conveyer E preferably communicating with a conveyer $e$ extending above a plurality of hoppers leading to individual kilns, suitable outlets being provided from the conveyer $e$ to the several hoppers.

F indicates a chamber with which the feed end of the kiln A communicates through an opening $g'$ in the wall $G'$. A curved dome or roof $f$ closes the upper end of the chamber F, the same being supported upon the inner surfaces of the walls $G'$ and $G^2$. Above the dome $f$ are a series of beams G supported at their ends upon the walls $G'$ and $G^2$ and which support a horizontal covering $g$, preferably made of a metallic plate. An air space is formed between the inner surface of the covering $g$ and outer surface of the dome $f$ which serves to conduct heat from the dome to the cover from which the heat is radiated. An opening $g^2$ is provided through the wall $G^2$ alining with the feed end of the kiln through which the interior of the kiln may be inspected.

$d$ designates an arch located below and in vertical alinement with the conveyer D for affording a secure support for the conveyer, the ends of the arch being supported upon the walls G' and G². The bottom of the wall G² is supported by an arch I extending over an opening through which the bottom of the chamber F communicates with a chamber J.

j indicates a dome or curved roof over the chamber J, the lower parallel side edges of the dome j being supported upon the adjacent parallel walls H' and H², as shown in Fig. 3. One of the curved ends of the dome j is supported upon the transverse wall G² and its other curved end forms an arch beneath a transverse wall L. The chamber J communicates beneath the wall L with a chamber K having a curved dome k supported at its horizontal side edges upon the parallel walls H' and H², as shown in Fig. 4. The curved ends of the dome k are supported between the transverse wall L and a transverse wall M at the base of the stack N. An opening m is provided through the wall M for placing the chamber K in communication with the stack N. An inclined floor n extends upwardly from the bottom of the chamber K to the wall O at the rear of the stack N, an opening o for the ingress of air being provided through the wall O above the upper edge of the floor n.

Extending beneath the chambers F, J and K in planes transverse to the kiln A, are conduits P', P² and P³ within which are located screw conveyers Q', Q² and Q³, respectively. The conduits P', P² and P³ are provided with curved roofs R', R² and R³ through which extend pairs of pipes q', q² and q³ which diverge upwardly from the respective conveyers Q', Q² and Q³. The ends of these diverging pipes extend through the curved roofs of the conduits and are provided with individual valves or gates q of any suitable construction. A plurality of pairs of such diverging pipes leading to the conveyers are provided beneath each of the chambers F, J and K, as shown in Fig. 5. Depressions are formed above the ends of the diverging pipes q', q² and q³ by means of the transverse bridge walls S' and S² between the conveyers Q', Q² and Q³, and by means of the longitudinal partitions s' and s². The surfaces of the bridge walls S' and S² and of the longitudinal partitions s' and s² converge downwardly around the upper end of each of the pipes leading to the conveyers, and such surfaces, together with the curved outer surface of the domes R', R² and R³ over the conduits, form hoppers in which the dust is collected and from which the dust is delivered through diverging pipes to conveyers Q', Q² and Q³, respectively. The ends of the conveyers Q', Q² and Q³ overlie and communicate with a longitudinal conveyer Q which extends to the rear of the smoke stack, where it communicates with the transverse conveyer T.

An elevator U extends upwardly from the conveyer Q and receives the dust therefrom at its lower end, the dust being discharged from the upper end of the elevator U through a chute u to the feed conveyer E by which the dust is returned to the feed hopper B.

Any suitable means may be provided for operating the several conveyers and the elevator. V, for instance, indicates a pulley to which power is communicated and which, through sprocket wheels and a connected chain, rotates the shaft v in the longitudinal conveyer Q. The sprocket wheels and chain V' connect the shaft v with the shaft v' which, through meshed bevel gears, rotates the shafts in the several conveyers Q', Q² and Q³. The rear end of the shaft v is provided with a bevel gear v² which operates with sprocket wheels and a chain for rotating the shaft in the conveyer T. The elevator is shown as operated by a motor W and suitable connections therefrom.

W² indicates a belt for operating the conveyer E through suitable power connections.

The operation of the embodiment of my invention shown in Figs. 1 to 5, inclusive, is as follows: Draft from the feed end of the kiln A to the stack N is downwardly through the chamber F beneath the wall G² into the larger chamber J, thence into the still larger chamber K, and thence through the somewhat restricted opening m in the transverse wall M, to the stack. Inasmuch as the horizontal cross section of the first chamber F is greater than the section of the kiln, the velocity of the draft downwardly through the chamber F is less than the velocity through the kiln, and as the vertical cross section of the chamber J is greater than the horizontal section of the chamber F, there is a further decrease in the velocity of the draft through the said chamber J. The vertical cross section of the chamber K being much larger than that of the preceding chamber J, there is a still further decrease in velocity, while the restricted opening m from the chamber K to the stack produces a relatively great velocity therethrough. The effect of the successive decreases in the velocity of the draft is to permit the articles of raw material to settle within the several pockets above the branch pipes leading to the conveyers. The draft adjacent the stack carries less dust than the draft adjacent the end of the kiln, and hence the decreased velocity of the draft from the kiln to the stack tends to equalize the distribution of the dust upon the floor above the conveyers. The air drawn into the stack through the opening o serves to still further obstruct the passage of the dust into the stack and to cause the same to settle upon the inclined wall n by which it is directed to the pockets above the conveyer Q³. At predetermined intervals an operator walks through the conduits P', P² and P³ and opens the several valves $q$ in the pairs of diverging pipes, so that the dust which is collected in the pockets above such pipes flows downwardly into the conveyers with which the pipes communicate, and by the conveyers is delivered to the common longitudinal conveyer Q and is returned to the feed hopper. The operator closes each of the valves $q$ after the material in the pocket controlled thereby has passed into the particular conveyer communicating therewith.

Referring to Figs. 6 to 10, inclusive, which illustrate another embodiment of my invention, A' designates the feed end of the rotary kiln, B' the feed hopper from which ground raw material is supplied to the conveyer C', through pipe $c'$, to conveyer D', to the end of the kiln. $d'$ indicates an arch beneath the conveyer D' for supporting the latter. F' indicates a chamber with which the feed end of the kiln communicates and which is formed between parallel transverse walls G³ and G⁴. Extending longitudinally across the chamber F' beneath the end of the kiln is a curved dome or roof I' communicating through the wall G⁴ with the chamber K'. The chamber K' communicates through a somewhat restricted passageway $m'$ with the stack N'. An opening $o'$ for permitting the ingress of air to the base of the stack is provided through the wall O'. Extending transversely beneath the passage $m'$ is the conduit P⁴ having a curved dome or roof R⁴. Located within the conduit P⁴ is a conveyer Q⁴ having diverging pipes $q^4$ and $q^5$ leading therefrom through the walls of the conduit. $k'$ indicates an inclined surface which extends downwardly from the wall G³ at a plane adjacent the lower edge of the dome I', to a plane beneath the end of the pipe $q^4$, which, together with the adjacent side wall of the conduit P⁴, forms a hopper for directing collected dust to the end of the pipe $q^4$. A downwardly inclined wall $n'$ extends from the base of the rear wall O' to a plane beneath the upper end of the pipe $q^5$, which, together with the adjacent curved surface of the wall of the conduit P⁴, forms a pocket from which material will flow into the pipe $q^5$. $k^2$ and $k^3$ indicate downwardly converging surfaces leading to the open upper end of the pipe $q^4$ which, together with the downwardly inclined surface $k'$, forms a hopper leading to the pipe $q^4$. $n^2$ indicates an inclined surface which, together with the inclosed surface $n'$ and the inner adjacent portion of the base of the stack, constitutes a hopper leading to the pipe $q^5$. The conveyer Q⁴ communicates with a longitudinal conveyer Q⁵ which in turn leads to a transverse conveyer T' at the back of the apparatus. An elevator U' receives material from the conveyer Q' and elevates the same to a point above the feed conveyer U' to which dust is delivered through a spout $u'$ to be returned to the feed hopper B' and thence again supplied to the kiln.

The operation of the form of my invention above described in connection with Figs. 6 to 10 is similar to the operation of the embodiment of my invention first described and illustrated in Figs. 1 to 5, inclusive. The draft from the kiln to the stack is through the chamber F', thence around and beneath the dome I' into the chamber K', which communicates through the restricted passageway $m'$ with the base of the stack N'. The dome I' serves to change the direction of draft and thereby cause much of the dust to fall upon the inclined bottom wall $k'$ and to be guided thereby into the pocket or hopper above the pipe $q^4$. The increased cross section of the chamber K' causes a decrease in the velocity of the draft therethrough, so that the dust more readily settles. The air passing through the opening $o'$ serves to obstruct the passage of the particles of raw material into the stack and to cause such particles to fall into the pocket leading to the pipe $q^5$. At predetermined intervals an operator opens suitable valves or gates $q'$ in the pipes $q^4$ and $q^5$ and permits the dust which has collected in the hoppers above such pipes to flow through them into the conveyer Q⁴ to be thence returned to the feed hopper.

From the foregoing description of the two embodiments of my invention herein disclosed, it will be observed that by my invention the particles of raw material which are carried by the draft from the feed end of the kiln toward the stack, are caused to settle before reaching the stack, and the dust thus collected may then be returned to the feed hopper to be again supplied to the kiln. The direction of the draft is changed and its velocity decreased so as to cause the particles of raw material to be precipitated and to fall by gravity into pockets and to thereby be prevented from passing into the stack.

My invention results not only in saving in the expense of operation, owing to the efficient collection of the dust, but also avoids injury to the surrounding property which otherwise results from the deposit thereon of the dust carried up the stack from the kiln.

I claim:

1. The combination with a cement kiln of a stack, a dust collecting chamber intermediate of and communicating with the feed end of the kiln and the stack, said chamber comprising portions progressively larger in cross section toward the stack to effect the settling of particles of material by the decreased velocity through said chamber, and a passage-way through which said chamber communicates with the stack of less area than the cross section of the chamber.

2. The combination with a cement kiln of a stack, a dust collecting chamber intermediate of and communicating with the feed end of the kiln and the stack, said chamber comprising portions progressively larger in cross section toward the stack to effect the settling of particles of material by the decreased velocity through said chamber, a passage-way through which said chamber communicates with the stack of less area than the cross section of the chamber, and an inclined wall extending upwardly from said chamber through said passage-way to the rear wall of the stack.

3. The combination with a cement kiln, of a stack, a plurality of dust collecting chambers intermediate of and communicating with the feed end of the kiln and the stack, said chambers being progressively larger in cross section toward the stack, and a chamber adjacent the stack communicating therewith through a passage of less area than the cross section of said chamber.

4. The combination with a cement kiln, of a stack, a dust collecting chamber intermediate of and communicating with the feed end of a kiln and the stack, the cross section of which is greater than the cross sections of the kiln and stack, a passageway through which said chamber communicates with the stack of less area than the cross section of the chamber, and means for admitting air into the stack at a point therein opposite its communication with said passageway.

5. The combination with a cement kiln, of a stack, a dust collecting chamber intermediate of and communicating with the feed end of the kiln and the stack, the cross section of which is greater than the cross sections of the kiln and stack and gradually increases in cross section toward the stack, a passageway through which said chamber communicates with the stack of less area than the cross section of the chamber, a dust receiving pocket in the bottom wall of said chamber, and an inclined wall extending upwardly from said pocket through said passageway to the rear wall of the stack.

6. The combination with a cement kiln, of a stack, a dust collecting chamber intermediate of and communicating with the feed end of the kiln and the stack, the cross section of which is greater than the cross sections of the kiln and stack, a passageway through which said chamber communicates with the stack of less area than the cross section of the chamber, a dust receiving pocket in the bottom wall of said chamber, an inclined wall extending upwardly from said pocket through said passageway to the rear wall of the stack, and means for admitting air into the stack at a point above the upper edge of said inclined wall and opposite the communication of said passageway with the stack.

7. The combination with a cement kiln, of a stack, a chamber with which the feed end of the kiln communicates, a second chamber with which said first chamber communicates at a level below the end of the kiln, a third chamber intermediate of and communicating with said second chamber and the stack, said chambers being of progressively greater section transversely of the direction of the draft through them, said third chamber communicating through a restricted passage with the stack, a plurality of pockets formed in the bottom walls of said chambers for receiving the precipitated dust, and an inclined wall extending upwardly from the pockets adjacent the stack through the passage leading to the rear wall of the stack.

8. The combination with a cement kiln, of a stack, a dust collecting chamber through which the kiln communicates with the stack, a plurality of pockets at the bottom of said chamber, a conduit extending transversely of said chamber at a level below said pockets, a conveyer within said conduit, and upwardly diverging pairs of pipes within said conduit leading from said conveyer and opening into adjacent pockets.

9. The combination with a cement kiln, of a stack, a dust collecting chamber through which the kiln communicates with the stack, a plurality of pockets at the bottom of said chamber extending transversely of the draft therethrough, a conveyer located beneath said pockets, a conduit extending downwardly from each of said pockets and communicating with said conveyer, and a valve controlling each of said conduits whereby when the desired amount of dust is collected in said pockets said valves may be opened and the collected dust delivered to said conveyer.

10. The combination with a cement kiln, of a stack, a chamber with which the feed end of the kiln communicates, a second chamber with which said first chamber communicates at a level below the end of the kiln, and a third chamber intermediate of and communicating with said second chamber and the stack, said chambers being of progressively greater cross section transversely of the direction of the draft through them.

11. The combination with a cement kiln, of a stack, a chamber with which the feed end of the kiln communicates, the wall of said chamber opposite the feed end of the kiln having an opening therein alining with the kiln, and a second chamber communicating with said first chamber and located at a level below the end of the kiln, said second chamber being of greater cross section than said first chamber transversely of the direction of the draft therethrough.

In testimony whereof, I have subscribed my name.

FRITZ WORM.

Witnesses:
  HENRY A. PARKS,
  E. M. ANDERSON.